Nov. 25, 1969     J. C. HURST ET AL     3,480,165
LOADING A PLURALITY OF ARTICLES INTO A WORKHOLDER
Filed Jan. 20, 1967     6 Sheets-Sheet 1
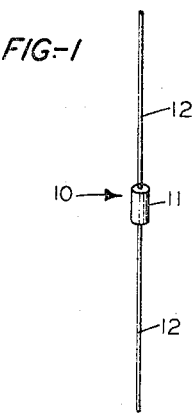
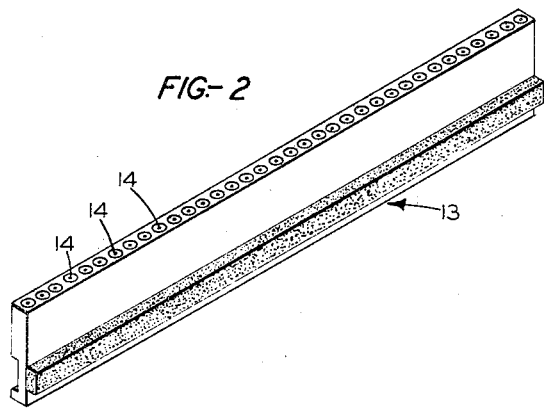
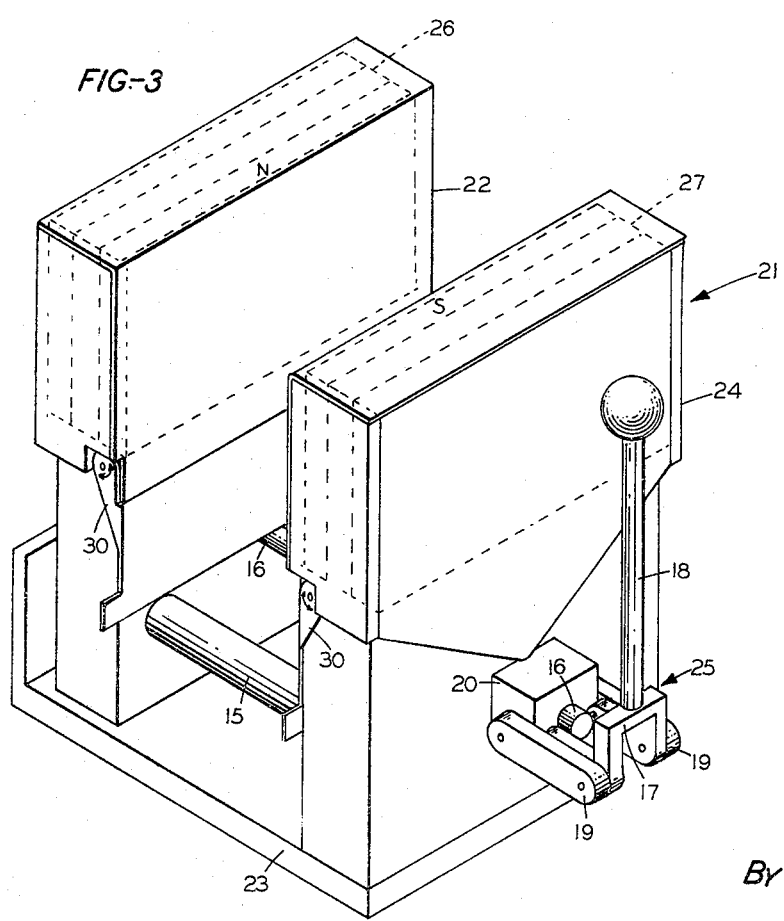
INVENTORS
J.C. HURST
S.E. KURTZ
By R. P. Miller
ATTORNEY

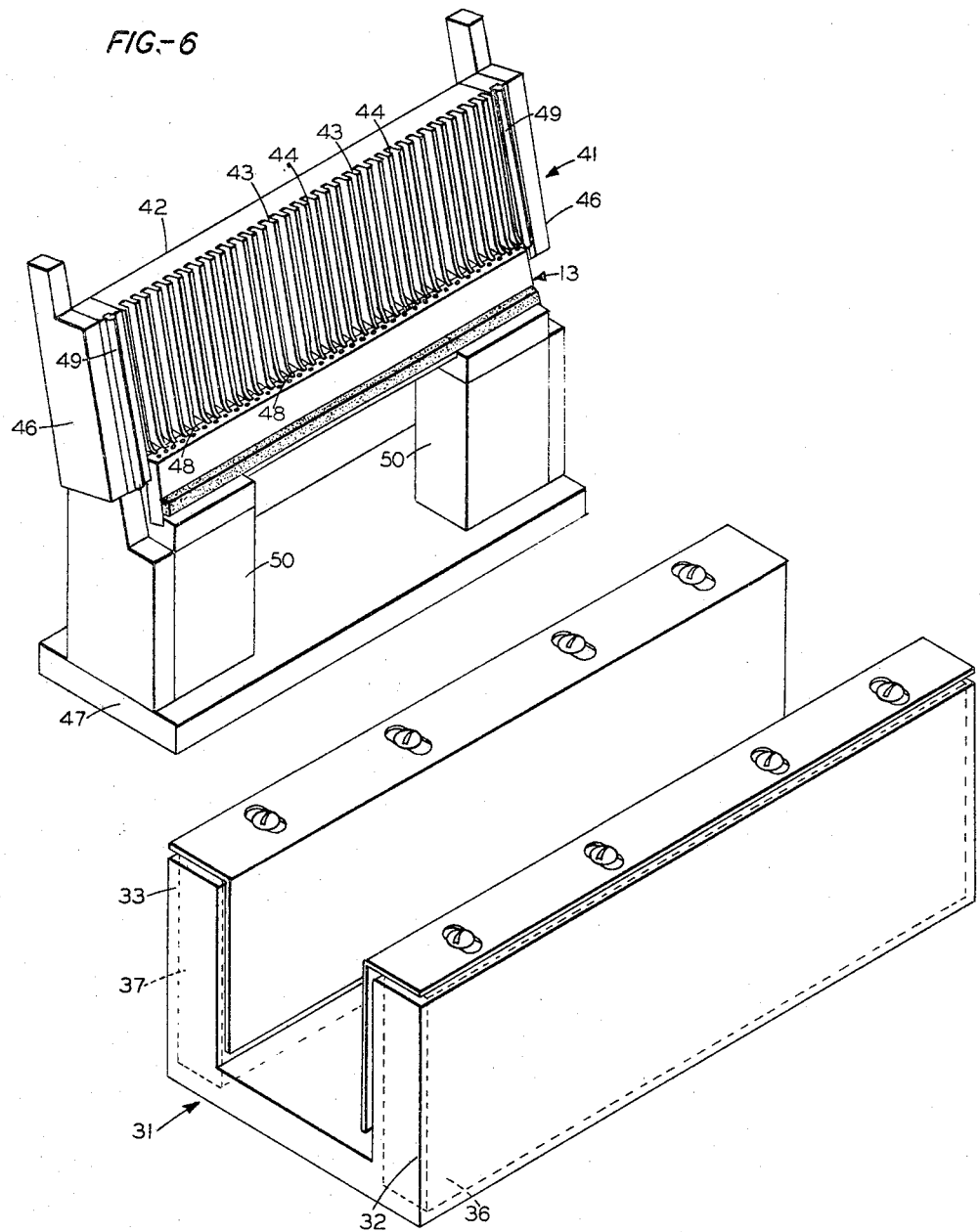

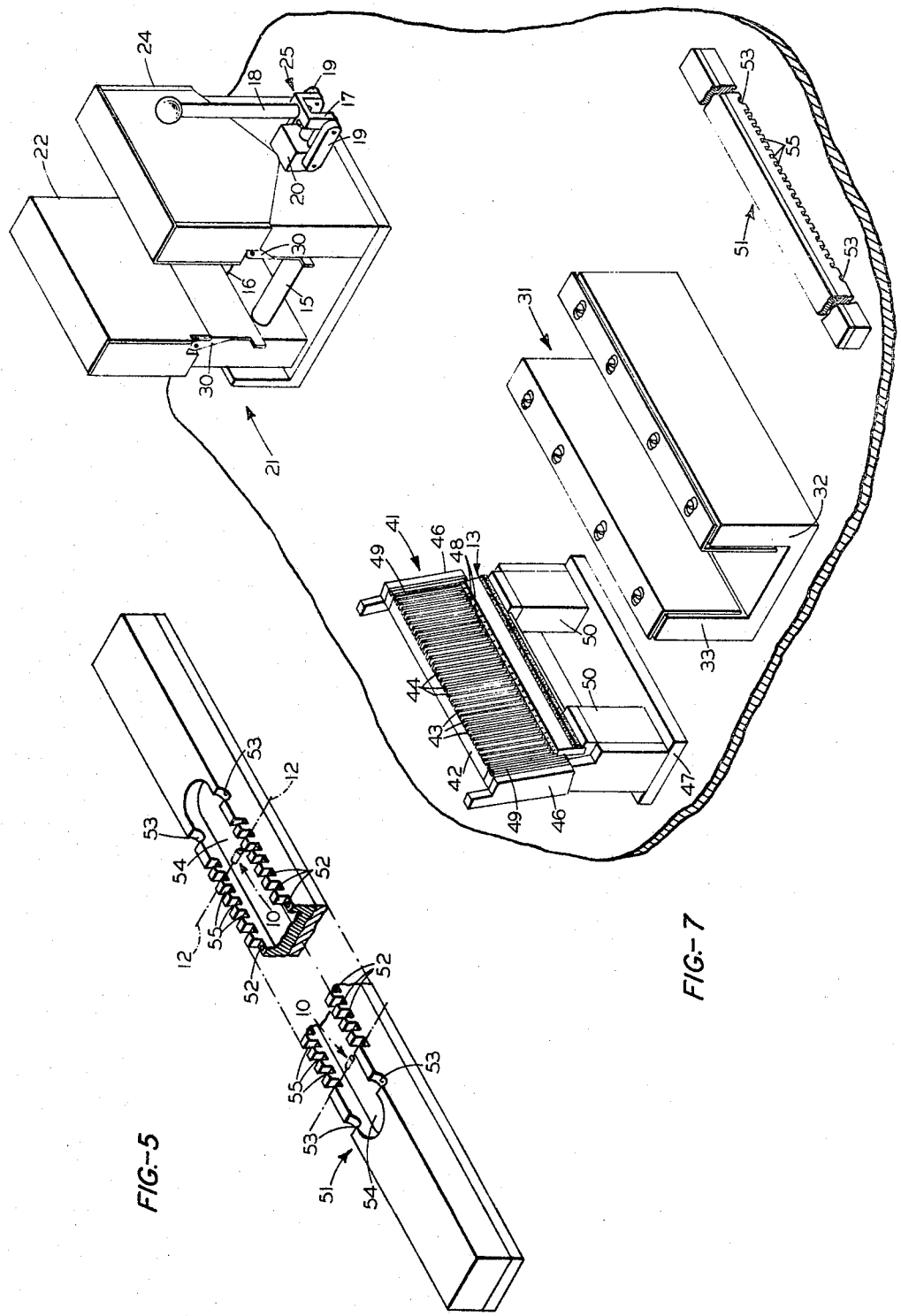

Nov. 25, 1969 J. C. HURST ET AL 3,480,165
LOADING A PLURALITY OF ARTICLES INTO A WORKHOLDER
Filed Jan. 20, 1967 6 Sheets-Sheet 4

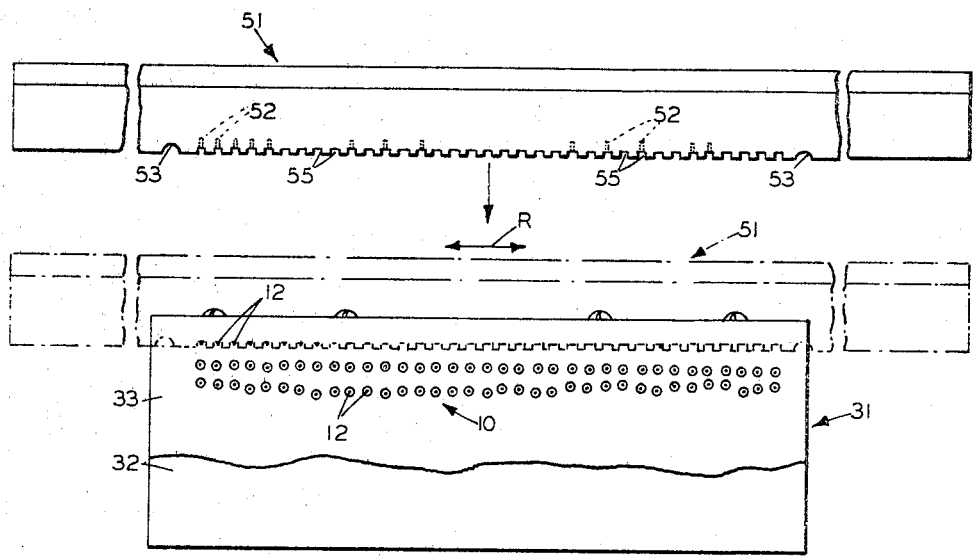
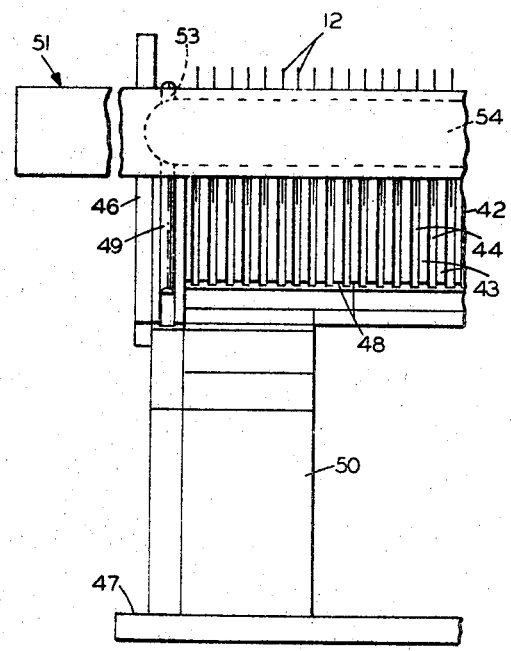
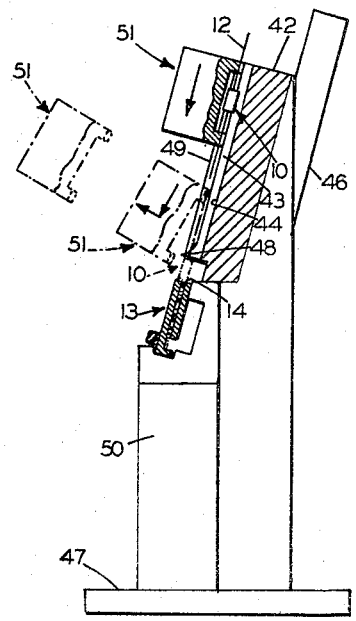

United States Patent Office 3,480,165
Patented Nov. 25, 1969

3,480,165
LOADING A PLURALITY OF ARTICLES INTO A WORKHOLDER
Jerry C. Hurst, Laureldale, and Samuel E. Kurtz, Reading, Pa., assignors to Western Electric Company, Incorporated, New York, N.Y., a corporation of New York
Filed Jan. 20, 1967, Ser. No. 610,675
Int. Cl. B65g 57/00; B66c 1/02
U.S. Cl. 214—152                                  8 Claims

ABSTRACT OF THE DISCLOSURE

Paramagnetic diodes are magnetically aligned, picked up and transferred with a magnetic wand, and then loaded into an apertured workholder in spaced parallel relationship to one another.

BACKGROUND OF THE INVENTION

In using a wave-type soldering apparatus for tinning elongated paramagnetic articles, such as diodes, the apparatus has a greater capacity than currently used methods for preparing and loading the articles to be tinned. Consequently, large expenditures for labor are necessary in order to load a sufficient number of workholders with diodes to operate the tinning apparatus at optimum capacity.

Another method, besides the obvious one of manual loading, involves the use of a vibratory bowl-type feeder to feed singular diodes downwardly through an escapement mechanism, after which the diodes are inserted into a belt in much the same way as cartridges are loaded into an ammunition belt. The belt is advanced until a predetermined number of diodes are lined up in front of a workholder whereupon the belt movement is halted and the workholder inserted over the leads of the diodes. The diodes are clamped into the workholder and are removed from the belt for a subsequent tinning operation. However, the hourly output using this method is only a slight improvement over that of manual loading. Furthermore, the equipment requires a permanent installation and occurrences of malfunction are experienced. There is a need for a more productive method of rapidly loading a plurality of elongated paramagnetic articles into workholders for subsequent operations thereon.

SUMMARY OF THE INVENTION

Accordingly, an object of this invention relates to new and improved methods of loading a plurality of paramagnetic articles into a workholder.

Another object of this invention resides in a method of magnetically suspending a plurality of elongated paramagnetic articles in a predetermined orientation and for then loading the articles into an apertured workholder.

A further object of this invention is to provide a new and improved method of magnetically suspending a plurality of paramagnetic articles and then interleaving the articles into alignment with each other whereupon a predetermined number of the articles are then attracted to a magnetic pickup and transferred to a loading rack where the articles are released from the pickup and inserted into a workholder.

A still further object of this invention is to suspend a mass of elongated paramagnetic articles in a magnetic field between two magnets having horizontal lines of force, thereafter manipulating the magnets to interleave and align the articles whereafter the articles are transferred with a magnetic or vacuum pickup for insertion a workholder.

With these and other objects in mind, the present invention contemplates a method of magnetically suspending and supporting a mass of paramagnetic articles between a pair of magnets after which the articles are interleaved and aligned and then withdrawn in predetermined quantity in spaced parallel relationship and inserted into a workholder.

More particularly, a mass of paramagnetic articles having a center body with leads extending colinearly from each end thereof is fed into a fixture having a pair of spaced magnetic plates which establish a magnetic field having horizontal lines of force to attract and suspend the articles in a generally horizontal manner against the magnetic plates, one at each end of the fixture. One of the plates is moved toward the other to interleave the articles attracted and held to either plate until the distance between the free end of the article and the adjacent magnetic plate is so small that all of the central bodies of the articles are substantially aligned.

An elongated pickup member having a plurality of pairs of magnets is passed into the fixture to attract and hold a predetermined number of articles. The pickup member is removed from the fixture and pressed against a loading rack having a predetermined number of grooves and then moved therealong to strip and release the articles from the member for insertion into an apertured workholder. The leads of the articles are clamped into the workholder which is then conveyed to an apparatus for solder tinning.

Other objects and advantages of the present invention will be apparent from the following detailed description when considered in conjunction with the accompanying drawings wherein:

BRIEF DESCRIPTION OF THE DRAWING

FIG. 1 is a perspective view of a stud-lead assembly, a predetermined number of which are magnetically loaded into a workholder by the method of the present invention;

FIG. 2 is a perspective view of an apertured workholder which is to be loaded by the method of the present invention;

FIG. 3 is a perspective view of a magnetic fixture which may be used to effectuate the step of interleaving two separate masses of magnetically suspended articles to align the articles;

FIG. 4 is a perspective view of another magnetic fixture which may be utilized for magnetically holding the aligned articles;

FIG. 5 is a perspective view of a pickup device or wand which may be used to effectuate the step of loading;

FIG. 6 is a perspective view of a loading fixture and apertured workholder mounted therein to receive articles from the pickup device shown in FIG. 5;

FIG. 7 is an overall perspective view of an arrangement of the apparatus shown in FIGS. 2–6 to carry out the method of the present invention; and FIGS. 8–14 are a series of view indicating the steps in loading the apertured workholder shown in FIG. 2 with a predetermined number of elongated paramagnetic stud-lead assemblies.

DETAILED DESCRIPTION

Figure 8:
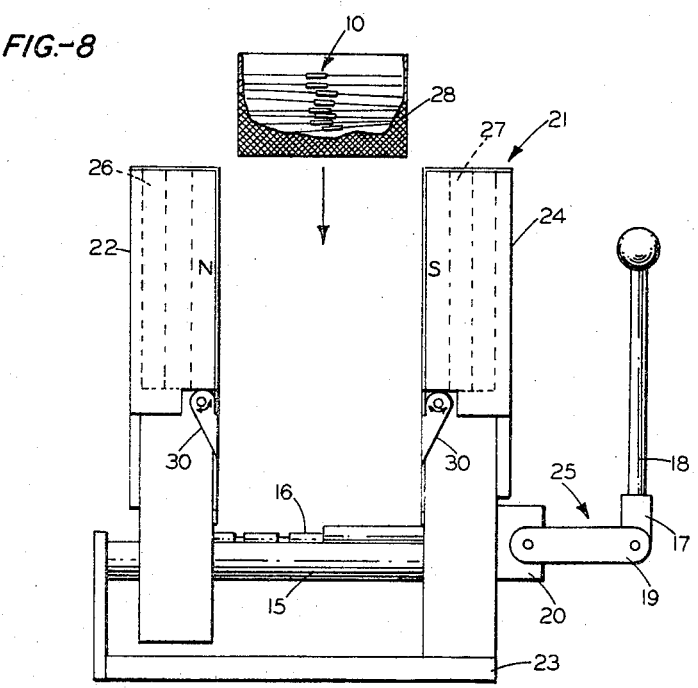

Referring to FIGURE 1, there is shown a stud-lead assembly 10, such as a semiconductor diode, comprising a stud or body 11 and a pair of paramagnetic wire leads 12. In the practice of the method of the invention, a plurality of these assemblies or other elongated paramagnetic articles, are to be loaded into an apertured workholder or rack 13 (see FIG. 2) having an array of apertures or bores 14 with the leads 12 of the assemblies inserted and bottomed in the apertures of the workholder.

Attention is next directed to FIGURE 3 which shows a fixture or magnetic bin 21 which may be used to practice the first sequence of steps of the present invention. The fixture 21 has an upstanding wall 22 slidably mounted with respect to a base 23. A wall 24 is mounted on a base 23 and is parallel to, but spaced from, the wall 22. The wall 22 is slidably movable with respect to the wall 24 by actuating a toggle device 25. The walls 22 and 24 are initially spaced apart a distance substantially greater than the length of the stud-lead assembly 10. When the toggle device 25 is operated, the wall 22 is moved to an inner position closer to the wall 24, the final distance between the walls is only slightly greater than the length of the stud-lead assembly 10.

Specifically, the fixture 21 includes a pair of guide rods 15 for slidably supporting the wall 22. The wall 22 is connected to the toggle device 25 by a rod 16 which is pivotally connected through an L-shaped bracket 17 to a handle 18. The handle is also pivotally connected to a pair of second links 19 pivotally mounted on a stationary block 20.

Positioned in the left and right-hand walls 22 and 24 are plate magnets 26 and 27, respectively, which establish horizontal magnetic lines of force. As shown in FIGURE 3, the left-hand magnet 26 has a north magnetic pole facing into the space between the walls 22 and 24, and the right-hand magnet 27 has a south magnetic pole facing into the space. Paramagnetic assemblies 10 positioned between the magnets 26 and 27 are aligned along the magnetic lines of force and are randomly attracted toward either magnet so that the free end of one of the leads 12 of each assembly 10 is attracted toward and into engagement with the inner face of either the wall 22 or 24.

It is to be noted that the plate magnets 26 and 27 do not extend the entire height of the walls 22 and 24. This permits a loading operator who is practicing the method of the invention to withdraw a nonmagnetic mesh basket 28 (see FIG. 8) which is used to deposit a mass of articles in the fixture 21, and facilitates the operator inserting a scoop 29 (see FIGS. 10 and 11) to capture a mass of the articles for transfer to another fixture. The basket 28 may be constructed of a nonmagnetic stainless steel with mesh holes that are smaller than the diameter of the leads 12—12.

Figure 9:
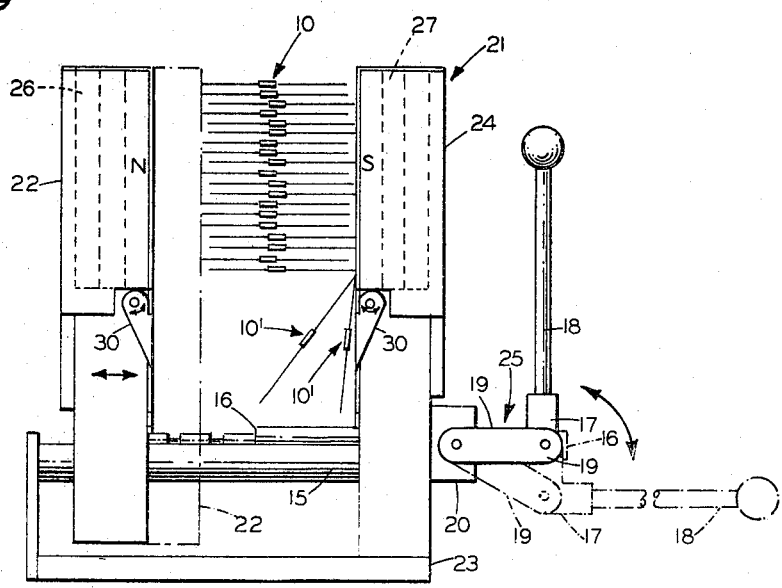

When a mass of stud-lead assemblies or articles 10 is deposited into the magnetic bin 21, some of the articles 10' near the bottom of the bin may drop out of the field and be suspended by one lead from either the magnet 26 in wall 22 or the magnet 27 in wall 24 (see FIG. 9). In order to reposition these articles back into the magnetic field, a hinged recovery or flipper plate 30 is provided on each wall 22 and 24 (see FIG. 3). Each of the recovery plates 30 extends the length of the wall 22 or 24 along the inside of the bin 21 and is pivoted about an axis spaced above the bottom of the bin. These plates 30 may be manually pivoted to move articles clinging against either wall back into the horizontal magnetic field.

An apparatus which may be used to practice the method also includes a shallow magnetic bin 31 (see FIG. 4). The shallow magnetic bin 31 comprises a pair of upstanding fixed walls 32 and 33 which are rectangular in shape and spaced apart a distance only slightly greater than the length of the stud-lead assembly 10. Positioned within the walls 32 and 33 are plate magnets 36 and 37, respectively, which, in this bin, extend throughout the entire height of the walls 32 and 33 and establish a magnetic field having horizontal lines of force. It should be noted that the length of the walls 32 and 33 is considerably greater than the length of the walls 22 and 24 in the first magnetic bin 21. The height of the walls 32 and 33 is chosen in order that an operator sitting on a standard height stool beside a standard height workbench with the bin 31 placed thereon, will experience minimum difficulty in looking and reaching into the bin while in a sitting position.

As shown in FIGURE 6, there is a loading rack 41 which includes a plate 42 having a plurality of parallel, spaced, ribs 43 to provide grooves 44 therebetween. The plate 42 is supported on a pair of standards 46—46 mounted on a base 47 and is slightly inclined to the vertical so that the grooves 44 are in an almost vertical position with a slight inclination to the rear of the workbench. It should also be noted that the ribs 43 are formed to have slight curved portions 48 which extend forwardly toward the shallow magnetic bin 31 (e.g., see FIG. 7). Also, the loading rack 41 has a pair of low friction material guide rails 49—49 formed at each end thereof. An apertured workholder 13, in which a predetermined number of stud-lead assemblies 10 are to be loaded, is positioned between the lower curved portions 48 of the grooves and a pair of notched pedestals 50—50. Each of the apertures or bores 14 of the workholder 13 is aligned with one of the grooves 44 of the loading rack 41.

In order to transfer the predetermined number of stud-lead assemblies 10 from the shallow magnetic bin into the apertured workholder 13, an operator may use as a pickup device an elongated magnetic handler or wand 51 which is shown in FIGURE 5. The magnetic handler 51 has two rows of rod-like magnets 52 which terminate in exposed poles in square notches 55 formed in the handler. The distance between the rows of the exposed poles of the magnets is greater than the length of the studs 11 and each pole 52 is positioned to attract one of the leads 12.

The magnets 52 are oriented so that the magnets in each row have the same pole on the same side of the magnetic handler 51. This will prevent the handler 51 from becoming directional, and from picking up stud-lead assemblies across adjacent sets of magnets 52. By a proper choice of magnets having small diameter pole pieces and by having only the very ends of the pole pieces exposed in the notches 55, the problem of picking up more than one stud-lead assembly at each magnet position on the magnetic handler 51 is minimized. The wand or handler 51 is formed with a guide channel 53 at each end thereof with a slot 54 extending transversely across the wand to accommodate the studs 11' of the assemblies 10.

A vacuum-type handler may be used instead of the magnetic handler 51. The vacuum handler would include an elongated wand having a plurality of opposed groups of apertures. For optimum operation, it has been found that each group should contain three apertures with the distance between the groups great enough to span the body portion 11 of the diode. In this way, each lead 12 is attracted and held against three apertures by the vacuum force. Work-holders 13 which have been loaded by an operator using the magnetic handler 51 are used during subsequent manufacturing operations, such as applying solder to the exposed leads 12.

Referring now to FIGURES 7–14, there are illustrated an overall arrangement of apparatus (FIG. 7) and the steps of a method (FIGS. 8–14) of loading the apertured workholder 13, involving a sequence in which the walls 22 and 24 of the magnetic bin 21 are manipulated to align the stud-lead assemblies 10. As shown in FIGURE 8, the operator moves the mesh basket 28, made from a nonmagnetic, stainless steel material and having a mass of etched stud-lead assemblies 10, into the space between the walls 22 and 24 of the magnetic bin 21. As the operator moves the basket from the top of the bin 21 to the bottom, the horizontal lines of magnetic force extend from one wall through the mesh basket and the assemblies 10 to the opposite wall. The stud-lead assemblies 10 are magnetically held and withdrawn from the moving basket and then are randomly attracted to either wall 22 or 24 as the basket is passed to the bottom of the bin 21. The operator then withdraws the mesh basket 28 from the bottom of the bin 21.

At this time, the mass of stud-lead assemblies are randomly attracted to either wall 22 or 24 and are held in a generally horizontal manner in a bundle along the horizontal lines of force established between the plate magnets 26 and 27. There is a substantial distance between the end of the free lead 12 of each stud-lead assembly to the opposite wall. Because of the distance between the walls 22 and 24, the studs 11 of the stud-lead assemblies 10 are not aligned and the ends of the leads of the mass of assemblies do not lie in the same plane. Any diodes 10′ falling out of the field are retrieved by pivoting the recovery or flipper plates 30 on the bottom inside of the bin.

Figure 10:
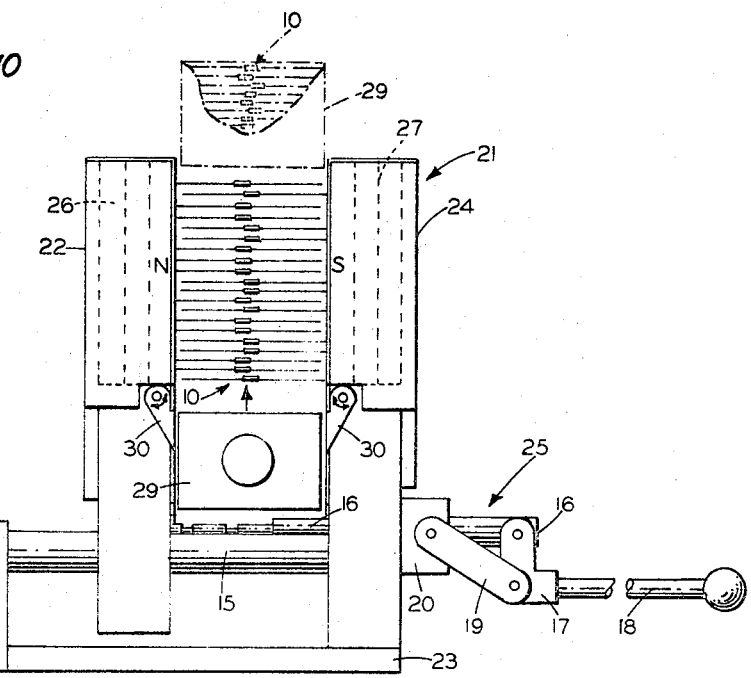

The loading operator then actuates the toggle clamp 25 (see FIG. 9) to slidably move the wall 22 inwardly toward the wall 24 and to interleave the two separate masses of assemblies until the distance between the two walls is only slightly greater than the length of the stud-lead assembly 10 (see FIG. 10). At this time, the stud-lead assemblies are substantially aligned in a bundle in lateral relationship with each other.

Figure 11:
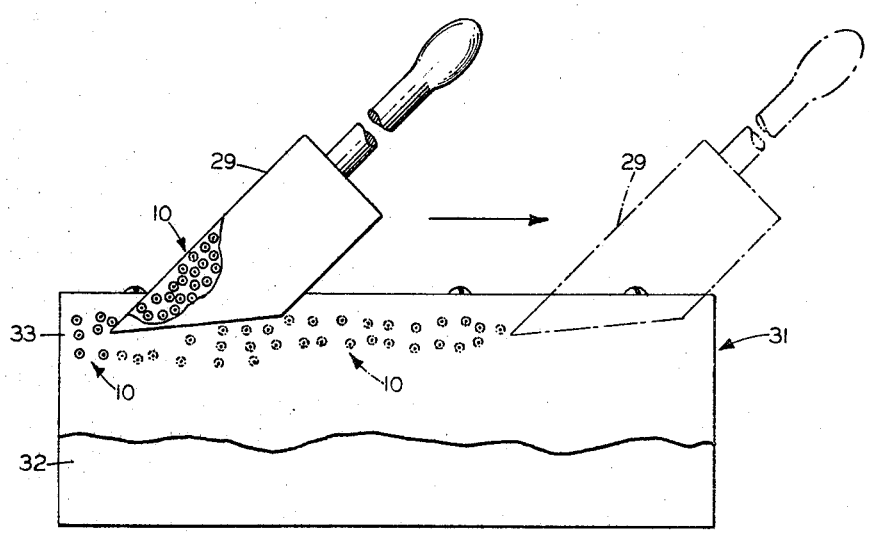

The loading operator then moves a nonmagnetic scoop 29 (see FIG. 10) into the bottom of the bin 21 where there are no magnetic lines of force, and raises the scoop to capture the bundle or a mass of the paramagnetic articles 10 within the scoop. The distance between the walls 22 and 24 after actuation of the toggle clamp 25 is equal to the length of the stud-lead assemblies plus the thickness of the scoop walls to permit insertion of the scoop. Because of the nonmagnetic stainless steel construction, the scoop 29 is of some aid in dissipating the magnetic field to facilitate the capturing of the magnetically held assemblies 10. Upon capturing a mass of stud-lead assemblies, the loading operator then moves the scoop into one end of the shallow transfer bin 31 (see FIGS. 7 and 11) and tilts the scoop upwardly to an inclined position as illustrated in FIG. 11.

The operator then moves the scoop along the bottom of the shallow magnetic bin wall holding the scoop in an inclined position. In this way, the stud-lead assemblies 10 are magnetically attracted and held while the scoop is moved. The stud-lead assemblies 10 are positioned and held along the horizontal lines of force established between magnets 36 and 37 between the walls 32 and 33 in the magnetic bin 31. When the operator withdraws the scoop from the other end of the magnetic bin 31, the magnetic stud-lead assemblies are distributed throughout the shallow bin 31 and are now positioned to readily be picked up by the magnetic handler 51.

In the next step of the method of the invention, a workholder 13 is placed on the notched pedestals 50—50 below the loading rack 41 with each of the apertures or bores 14 aligned with one of the grooves 44 in the loading rack.

The loading operator then grasps one end of the magnetic handler 51 in each hand (see FIG. 12) and moves the magnetic handler in a generally horizontal fashion into the shallow bin 31. The operator manipulates the magnetic handler 51 in a general reciprocatory motion, as indicated by arrow R, until stud-lead assemblies 10 have been attracted and held against all the pairs of pole pieces 52—52.

The operator then removes the magnetic handler 51 with the stud-lead assemblies 10 held in parallel spaced relationship thereagainst, and places the handler against the loading rack 41 as shown in FIGURES 13 and 14. The handler 51 is tilted into an oblique position to place each of the stud-lead assemblies 10 in one of the grooves 44 formed in the rack plate 42 and so that each of the guide rails 49—49 of the rack 41 is received in one of the channels 53 at either end of the handler 51. The guide rails 49—49 assist the operator in lining up the wand 51 with the loading rack and further serves to maintain the wand in a horizontal position to prevent bending the leads 12 within the grooves 44 and apertures 14.

Then the handler 51 is slid downwardly (see FIG. 14) along the ribs 43 of the loading rack transverse to the stud-lead assemblies, thereupon moving the lower or first leads 12 into the apertures 14 of the workholder 13 previously positioned on the pedestals 50 beneath the loading rack 41. As the handler 51 rides above the curved portions 48 of the ribs 43 at the bottom of the rack 41, the handler is necessarily moved outwardly away from the stud-lead assemblies 10. This automatically forces the lower pole piece 52 of each magnet of the handler 51 away from the lower lead 12 to break the magnetic bond between the assemblies 10 and the handler 51. When this occurs, the stud-lead assemblies 10 are free to fall by gravity a remaining distance within the grooves 44 downwardly into the apertures 14 of the workholder 13. The lower ends of the first leads come to rest against the bottoms of the bores 14. The loaded workholder 13 is now ready to be used in a subsequent fabricating and conveying operation.

It should be understood that the method of this invention could be practiced as well by using only one magnetic loading bin 21 instead of the two bins 21 and 31 hereinbefore described. However, if only one bin should be used, a false bottom would have to be inserted into the bin 21 before the handler 51 is passed downwardly and manipulated to pick up the predetermined number of stud-lead assemblies 10. Otherwise, the assemblies would be pushed toward the bottom of the bin, and since the plate magnets 26 and 27 do not extend the entire height of the walls 22 and 24, the assemblies would fall to the bottom out of the magnetic field.

However, it has also been found to be more advantageous from a product flow standpoint to use the two bins with the first aligning bin loaded by the operator to the rear of the loading position. In this way, the loading operator can be performing some subsequent step in the method of this invention while the bin 21 is being loaded by another operator. Also, an advantage is gained in that when the stud-lead assemblies have been transferred to the shallow bin, all subsequent operations can be performed by the loading operator in a sitting position which, of course, reduces the fatigue aspect of the operation.

It is to be understood that the above-described arrangements and sequence of steps are simply illustrative of the application of the principles of this invention. Numerous other arrangements may be readily devised by those skilled in the art which will embody the principles of the invention and fall within the spirit and scope thereof.

We claim:

1. A method of loading an apertured workholder with paramagnetic leads axially extending from electrical components, which comprises:

spreading a mass of components along a magnetic field having parallel lines of force;

manipulating a magnetic wand in said magnetic field to magnetically lift a spaced array of said components from said field;

advancing said array of lifted components along grooves in a fixture to guide the leads of the components into apertures formed in the workholder; and transversely moving the magnetic wand relative to said fixture to release the components guided into said apertures so that the leads move to engage the bottoms of said apertures and support said components above said workholder.

2. A method of manipulating a wand having longitudinally spaced magnets to load a mass of paramagnetic articles into a fixture having longitudinally spaced apertures which comprises:

supporting a mass of articles in parallel relationship;

passing the wand transversely and relative to said mass of articles to attract an article to each of said magnets;

aligning the articles attracted to said wand with said apertures in said fixture;

moving said wand toward said fixture to insert said articles into said apertures; and then pulling said wand transversely of, and away from, said fixture to strip said articles from said wand.

3. A method of manipulating a wand having longitudinally spaced magnets to load a mass of intermingled paramagnetic articles into a fixture having spaced, parallel ribs spanning apertures formed in a workholder, which comprises:

subjecting the mass of articles to a unidirectional magnetic field having parallel lines of force to support said articles in parallel relationship;

passing the wand through said supported articles to attract and hold a plurality of said articles against said spaced magnets;

moving the wand to place said held articles between said ribs of said fixture;

advancing said wand along said ribs to advance said articles into said workholder apertures; and then, moving said wand away from said articles to strip the articles from the wand.

4. A method for loading a plurality of elongated paramagnetic articles, suspended in a magnetic field having horizontal lines of force between a pair of opposed, movable, magnets, spaced apart a distance substantially greater than the length of the articles, into an apertured workholder positioned in a fixture beneath a loading rack, comprising the steps of:

moving said pair of opposed magnets toward each other to interleave said articles into alignment with each other;

passing a magnetic pickup device into said magnetic field transversely to said articles;

manipulating said pickup device to attract and hold a predetermined number of articles in spaced parallel relationship;

removing said pickup device and the articles held thereto from said magnetic field;

pressing said pickup device against a loading rack having the predetermined number of grooves to position each of said predetermined number of articles in one of said grooves;

moving said pickup device along said rack to advance said articles into apertured workholders; and then imparting a relative movement between said pickup device and said articles to release said articles.

5. A method of loading a mass of elongated paramagnetic articles as set forth in claim 4 wherein the imparting of relative movement comprises the step of:

gradually moving said pickup device along and then out from said rack transversely of said grooves to overcome the magnetic attraction between said articles and said pickup device whereupon the articles are released from said pickup device into said apertured workholder.

6. A method of loading elongated paramagnetic articles held in spaced parallel relationship against a magnetic wand pickup into apertures formed in a nonmagnetic workholder positioned below a grooved loading rack which includes the steps of:

positioning a pair of magnets a first distance apart to establish a first magnetic field with horizontal lines of force between;

placing a bundle of said articles in said field to abut an end of each article against one or the other of two spaced magnets;

decreasing the space between said magnets to interleave the articles;

removing the bundle of articles from said magnetic field;

spreading the bundle of articles along a second magnetic field to distribute the articles along horizontal lines of force in said second field;

manipulating a magnetic pickup in said second magnetic field to attract and hold a predetermined number of articles;

positioning said pickup to move the articles against the grooved loading rack so that each of said predetermined number of articles is received in a groove;

sliding said pickup along said rack to advance said articles into said apertures in said workholder; and then transversely moving said pickup to strip said articles from said pickup whereupon the articles are released and fall into apertures of a workholder aligned with said grooved rack.

7. A method of transferring a plurality of parallel spaced elongated articles which are magnetically held to a pickup member into a workholder having a plurality of apertures including the steps of:

placing a plate having a plurality of spaced parallel grooves above said workholder to align the grooves with the apertures of said workholder;

placing the pickup member transversely across the plurality of spaced parallel grooves to position each of said articles in one of said grooves;

moving the pickup member downwardly to slide the lower ends of the articles into the apertures in said workholder; and then moving the pickup member away from the grooved plate to overcome the magnetic force exerted by said pickup member on said articles to release said articles from the pickup member whereupon the articles drop into the apertures in the workholder.

8. A method of manipulating an elongated handler to load a group of elongated articles into a workholder having a series of spaced apertures, wherein said handler has a series of attraction force applying devices spaced therealong at distances equal to the distances between said apertures, which comprises:

spacially supporting a mass of said elongated articles with their longitudinal axes in parallel relationship;

imparting repeated longitudinally transverse relative movement between said handler and said mass of articles to apply attraction forces intermediate the ends of the articles to hold a spaced array of articles along said handler with the ends of said articles laterally projecting from one side of said handler;

moving said handler to insert said ends of said articles into said apertures; and then imparting relative motion between said handler and workholder to overcome said attraction forces to deposit said articles in said apertures.

References Cited

UNITED STATES PATENTS

| | | | |
|---|---|---|---|
| 1,080,435 | 12/1913 | Gamper. | |
| 3,061,919 | 11/1962 | Tack | 29—433 XR |
| 3,257,141 | 6/1966 | Buus et al. | 294—65.5 |
| 3,303,928 | 2/1967 | Meilleur | 214—152 XR |

GERALD M. FORLENZA, Primary Examiner

F. E. WERNER, Assistant Examiner

U.S. Cl. X.R.

294—65.5